United States Patent
Yang

(10) Patent No.: US 12,238,487 B2
(45) Date of Patent: Feb. 25, 2025

(54) EARPHONE DEBUGGING METHOD AND DEVICE, AND STORAGE MEDIUM

(71) Applicant: GOERTEK INC., Shandong (CN)

(72) Inventor: Pei Yang, Shandong (CN)

(73) Assignee: GOERTEK INC., Weifang (CN)

( * ) Notice: Subject to any disclaimer, the term of this patent is extended or adjusted under 35 U.S.C. 154(b) by 245 days.

(21) Appl. No.: 17/995,155

(22) PCT Filed: Oct. 29, 2020

(86) PCT No.: PCT/CN2020/124837
§ 371 (c)(1),
(2) Date: Sep. 30, 2022

(87) PCT Pub. No.: WO2021/196578
PCT Pub. Date: Oct. 7, 2021

(65) Prior Publication Data
US 2023/0224654 A1    Jul. 13, 2023

(30) Foreign Application Priority Data
Mar. 31, 2020 (CN) .......................... 202010248598.1

(51) Int. Cl.
*H04R 29/00* (2006.01)
*G06F 40/205* (2020.01)
(Continued)

(52) U.S. Cl.
CPC ......... *H04R 29/001* (2013.01); *G06F 40/205* (2020.01); *H04R 1/1041* (2013.01); *H04R 3/12* (2013.01); *H04R 2420/07* (2013.01)

(58) Field of Classification Search
CPC ...... H04R 29/001; H04R 1/1041; H04R 3/12; H04R 2420/07; G06F 40/205
(Continued)

(56) References Cited

U.S. PATENT DOCUMENTS

| 10,412,567 B1 | 9/2019 | Tong et al. |
| 2012/0230510 A1* | 9/2012 | Dinescu ................. H04R 5/033 381/80 |

(Continued)

FOREIGN PATENT DOCUMENTS

| CN | 104216719 A | 12/2014 |
| CN | 108833542 A | 11/2018 |

(Continued)

OTHER PUBLICATIONS

International Search Report from International Application No. PCT/CN2020/124837 mailed Jan. 27, 2021.

*Primary Examiner* — William J Deane, Jr.
(74) *Attorney, Agent, or Firm* — Shih IP Law Group, PLLC.

(57) ABSTRACT

Embodiments of the present disclosure provide an earphone debugging method and device, and a storage medium. The earphone debugging method comprises the following steps: obtaining configuration parameters to be updated of a slave earphone and configuration parameters to be updated of a master earphone by the master earphone; sending, by the master earphone, the configuration parameters to be updated of the slave earphone to the slave earphone, which allows the slave earphone to be operated according to the configuration parameters to be updated of the slave earphone; and the master earphone being operated according to the configuration parameters to be updated of the master earphone. According to the embodiments of the present disclosure, the earphone debugging efficiency is improved.

9 Claims, 1 Drawing Sheet

(51) Int. Cl.
  *H04R 1/10*    (2006.01)
  *H04R 3/12*    (2006.01)
(58) Field of Classification Search
  USPC .................................................... 381/59, 58
  See application file for complete search history.

(56) References Cited

U.S. PATENT DOCUMENTS

| | | | | |
|---|---|---|---|---|
| 2021/0045191 A1* | 2/2021 | Hsieh | ................. | H04L 65/1069 |
| 2022/0377478 A1* | 11/2022 | Huang | ................... | H04R 29/00 |
| 2023/0217515 A1* | 7/2023 | Deng | .................... | H04W 76/14 |
| | | | | 455/41.1 |
| 2023/0224654 A1* | 7/2023 | Yang | .................... | H04R 1/1041 |
| | | | | 381/59 |

FOREIGN PATENT DOCUMENTS

| | | |
|---|---|---|
| CN | 109314813 A | 2/2019 |
| CN | 109495867 A | 3/2019 |
| CN | 109495868 A | 3/2019 |
| CN | 110278506 A | 9/2019 |
| CN | 110659046 A | 1/2020 |
| CN | 110795127 A | 2/2020 |
| CN | 110825411 A | 2/2020 |
| CN | 110908687 A | 3/2020 |
| CN | 111464920 A | 7/2020 |

* cited by examiner

EARPHONE DEBUGGING METHOD AND DEVICE, AND STORAGE MEDIUM

This application claims the priority of Chinese Patent Application No. 202010248598.1 with a title of invention "EARPHONE DEBUGGING METHOD AND DEVICE, AND STORAGE MEDIUM", filed to the China Patent Office on Mar. 31, 2020, which is hereby incorporated by reference in its entirety.

TECHNICAL FIELD

The present disclosure relates to the technical field of earphones, and in particular, to an earphone debugging method and device, and a storage medium.

BACKGROUND ART

With the rapid development of artificial intelligence technology, demand for intelligent wearable products such as TWS (True Wireless Stereo) Bluetooth earphones have been increasing and the intelligent wearable products have more and more functions. Among them, the TWS technology is proposed on the basis of the development of chip technology. Specifically, a mobile phone is connected to a master earphone and then the master earphone is connected to a slave earphone via Bluetooth, so as to realize the true wireless Bluetooth, i.e., individual left and right channels.

EQ (Equalizer) is mainly used for the gain or attenuation on one or more frequency bands of sound to adjust the timbre. Generally, EQ configuration parameters are used for the gain or attenuation on one or more frequency bands of sound to adjust the timbre. EQ configuration parameters generally include the following three parameters: frequency, a parameter indicating a specific frequency value; gain, a parameter indicating the gain or attenuation on a preset F value; and quantize, a parameter indicating a "width" of frequency band to be gained or attenuated. At present, EQ debugging of traditional Bluetooth earphones has the following disadvantages.

1. EQ debugging has to be implemented with a wire, so it needs to be wired out by welding and the debugging is operated by using a computer, which is complicated.
2. The computer can only set EQ parameters for one of a pair of earphones at a time, and if the earphone is powered off, EQ parameters has to be set again.
3. For EQ debugging of a pair of earphones, it is necessary to set the parameters of the left and right earphones one-by-one by the computer, then remove the wires for listening test, and when it is necessary to modify the parameters and re-test, it is also necessary to be re-wired for parameter setting, so online dynamic debugging is impossible.

SUMMARY

A main object of the present application is to provide an earphone debugging method and device, and a storage medium, aiming at improving the efficiency of debugging earphones and reducing the cost of debugging earphones.

In order to achieve the above object, the present application provides an earphone debugging method, wherein the earphone includes a master earphone and a slave earphone, and the master earphone is communicated with the slave earphone.

The earphone debugging method includes the following steps: obtaining configuration parameters to be updated of the slave earphone and configuration parameters to be updated of the master earphone by the master earphone; sending, by the master earphone, the configuration parameters to be updated of the slave earphone to the slave earphone, which allows the slave earphone to operate according to the configuration parameters to be updated of the slave earphone; and the master earphone operating according to the configuration parameters to be updated of the master earphone.

Optionally, the method further includes, before the step of obtaining configuration parameters to be updated of the slave earphone and configuration parameters to be updated of the master earphone by the master earphone: obtaining current configuration parameters of the slave earphone and current configuration parameters of the master earphone by the master earphone; and sending the current configuration parameters of the slave earphone and the current configuration parameters of the master earphone to a preset terminal device by the master earphone, which allows the preset terminal device to configure the configuration parameters to be updated of the slave earphone according to the current configuration parameters of the slave earphone and to configure the configuration parameters to be updated of the master earphone according to the current configuration parameters of the master earphone.

Optionally, the step of obtaining current configuration parameters of the slave earphone and current configuration parameters of the master earphone by the master earphone includes: receiving, by the master earphone, a configuration update instruction sent by the preset terminal device; sending the configuration update instruction to the slave earphone and receiving the current configuration parameters of the slave earphone sent back from the slave earphone, by the master earphone; and obtaining the current configuration parameters of the master earphone from a local storage device according to the configuration update instruction by the master earphone.

Optionally, the method further includes, after the step of sending, by the master earphone, the configuration parameters to be updated of the slave earphone to the slave earphone: determining, by the master earphone, whether the sending of the configuration parameters to be updated of the slave earphone is completed; and storing the configuration parameters to be updated of the master earphone to a local storage device by the master earphone if the sending of the configuration parameters to be updated of the slave earphone is completed.

Optionally, the method further includes, after the step of determining, by the master earphone, whether the sending of the configuration parameters to be updated of the slave earphone is completed: if the sending of the configuration parameters to be updated of the slave earphone is failed, the method returns to the step of sending the configuration parameters to be updated of the slave earphone to the slave earphone.

Optionally, the step of obtaining configuration parameters to be updated of the slave earphone and configuration parameters to be updated of the master earphone by the master earphone includes: obtaining a file of configuration parameters to be updated from a preset terminal device by the master earphone; and parsing the file of configuration parameters to be updated and obtaining the configuration parameters to be updated of the slave earphone and the configuration parameters to be updated of the master earphone, by the master earphone.

Optionally, the method further includes, before the step of obtaining a file of configuration parameters to be updated from the preset terminal device by the master earphone:

obtaining a Bluetooth broadcast address of the master earphone by the master earphone; and sending the Bluetooth broadcast address of the master earphone to the preset terminal device by the master earphone, which allows the preset terminal device to send the file of configuration parameters to be updated according to the Bluetooth broadcast address.

Optionally, the method further includes, after the step of obtaining configuration parameters to be updated of the slave earphone and configuration parameters to be updated of the master earphone by the master earphone: the master earphone verifying the configuration parameters to be updated of the slave earphone and the configuration parameters to be updated of the master earphone; and if the verification is passed, performing the step of sending, by the master earphone, the configuration parameters to be updated of the slave earphone to the slave earphone.

In order to achieve the above object, the present application also provides an earphone debugging device, including a memory, a processor, and an earphone debugging program stored in the memory and executable on the processor, wherein when the processor executes the earphone debugging program, the steps of the earphone debugging method as described above are performed.

In order to achieve the above object, the present application also provides a storage medium, on which an earphone debugging program is stored, wherein when a processor executes the earphone debugging program, the steps of the earphone debugging method as described above are performed.

According to the embodiments of the present application, configuration parameters to be updated of the slave earphone and configuration parameters to be updated of the master earphone are obtained from the master earphone, the configuration parameters to be updated of the slave earphone is sent to the slave earphone, so that the slave earphone operates according to the configuration parameters, and the master earphone operates according to the configuration parameters to be updated of the master earphone. In this way, the configuration parameters of the master earphone and the slave earphone can be updated at the same time, and online dynamic debugging of the earphone can be achieved, effectively improving the debugging efficiency of developers and reducing the debugging cost of the developers.

BRIEF DESCRIPTION OF THE DRAWINGS

In order to more clearly illustrate the embodiments of the present application or the embodiments in the prior art, the following will briefly introduce the accompanying drawings required for the description of the embodiments or the prior art. Obviously, the drawings in the following description are only part of the drawings of the present application, and for those skilled in the art, other drawings can also be obtained according to the provided drawings without any creative effort.

DETAILED DESCRIPTION OF THE EMBODIMENTS

The embodiments of the present application will be described below with reference to the drawings in the embodiments of the present application. Obviously, the described embodiments are only part of the embodiments of the present application, rather than all the embodiments. Based on the embodiments in the present application, all other embodiments obtained by persons of ordinary skill in the art without creative efforts shall fall within the protection scope of the present application.

In an embodiment of the present application, configuration parameters to be updated of the slave earphone and configuration parameters to be updated of the master earphone can be obtained by the master earphone, and sends the configuration parameters to be updated of the slave earphone to the slave earphone, so that the slave earphone operates according to the configuration parameters to be updated, and the master earphone operates according to the configuration parameters to be updated of the master earphone.

According to an embodiment of the present application, configuration parameters to be updated of the slave earphone and configuration parameters to be updated of the master earphone are obtained by the master earphone, and sends the configuration parameters to be updated of the slave earphone to the slave earphone, so that the slave earphone operates according to the configuration parameters to be updated, and the master earphone operates according to the configuration parameters to be updated of the master earphone. In this way, the configuration parameters of the master earphone and the slave earphone can be updated at the same time, and online dynamic debugging of the earphone can be achieved, effectively improving the debugging efficiency of developers and reducing the debugging cost of the developers.

Figure 1:
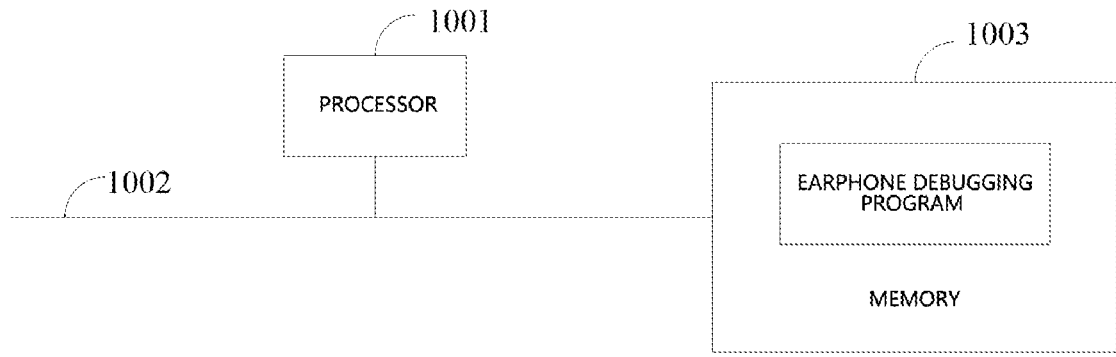
FIG. 1 is a schematic view of the configuration of an electronic device which is a hardware operating environment of an embodiment of the present application.

The earphone debugging device according to an embodiment of the present disclosure may has a hardware configuration as shown in FIG. 1.

This embodiment of the present application provides an earphone debugging device, the earphone debugging device includes a processor 1001 (for example, CPU), a communication bus 1002, and a memory 1003. The communication bus 1002 is provided for the connection and communication between the components.

The memory 1003 may be a high-speed RAM memory, or a non-volatile memory such as a disk memory. As shown in FIG. 1, the memory 1003, as a computer storage medium, may include an earphone debugging program therein, and the processor 1001 may be configured to perform the earphone debugging program stored in the memory 1003 to perform the following steps: obtaining configuration parameters to be updated of the slave earphone and configuration parameters to be updated of the master earphone by the master earphone; sending, by the master earphone, the configuration parameters to be updated of the slave earphone to the slave earphone, which allows the slave earphone to operate according to the configuration parameters to be updated of the slave earphone; and the master earphone operating according to the configuration parameters to be updated of the master earphone.

Optionally, the processor 1001 may be configured to perform the earphone debugging program stored in the memory 1003 to perform the following steps: obtaining current configuration parameters of the slave earphone and current configuration parameters of the master earphone by the master earphone; and sending the current configuration parameters of the slave earphone and the current configuration parameters of the master earphone to a preset terminal device by the master earphone, which allows the preset terminal device to configure the configuration parameters to be updated of the slave earphone according to the current configuration parameters of the slave earphone and to configure the configuration parameters to be updated of the master earphone according to the current configuration parameters of the master earphone.

Optionally, the processor 1001 may be configured to perform the earphone debugging program stored in the memory 1003 to perform the following steps: receiving, by the master earphone, a configuration update instruction sent by the preset terminal device; sending the configuration update instruction to the slave earphone and receiving the current configuration parameters of the slave earphone sent back from the slave earphone, by the master earphone; and obtaining the current configuration parameters of the master earphone from a local storage device according to the configuration update instruction, by the master earphone.

Optionally, the processor 1001 may be configured to perform the earphone debugging program stored in the memory 1003 to perform the following steps: determining, by the master earphone, whether the sending of the configuration parameters to be updated of the slave earphone is completed; and storing the configuration parameters to be updated of the master earphone to a local storage device by the master earphone if the sending of the configuration parameters to be updated of the slave earphone is completed.

Optionally, the processor 1001 may be configured to perform the earphone debugging program stored in the memory 1003 to perform the following steps: if the sending of the configuration parameters to be updated of the slave earphone is failed, the method returns to the step of sending the configuration parameters to be updated of the slave earphone to the slave earphone.

Optionally, the processor 1001 may be configured to perform the earphone debugging program stored in the memory 1003 to perform the following steps: obtaining a file of configuration parameters to be updated from a preset terminal device by the master earphone; and parsing the file of configuration parameters to be updated and obtaining the configuration parameters to be updated of the slave earphone and the configuration parameters to be updated of the master earphone by the master earphone.

Optionally, the processor 1001 may be configured to perform the earphone debugging program stored in the memory 1003 to perform the following steps: obtaining a Bluetooth broadcast address of the master earphone by the master earphone; and sending the Bluetooth broadcast address of the master earphone to the preset terminal device by the master earphone, which allows the preset terminal device to send the file of configuration parameters to be updated according to the Bluetooth broadcast address.

Optionally, the processor 1001 may be configured to perform the earphone debugging program stored in the memory 1003 to perform the following steps: the master earphone verifying the configuration parameters to be updated of the slave earphone and the configuration parameters to be updated of the master earphone; and if the verification is passed, performing the step of sending, by the master earphone, the configuration parameters to be updated of the slave earphone to the slave earphone.

Figure 2:
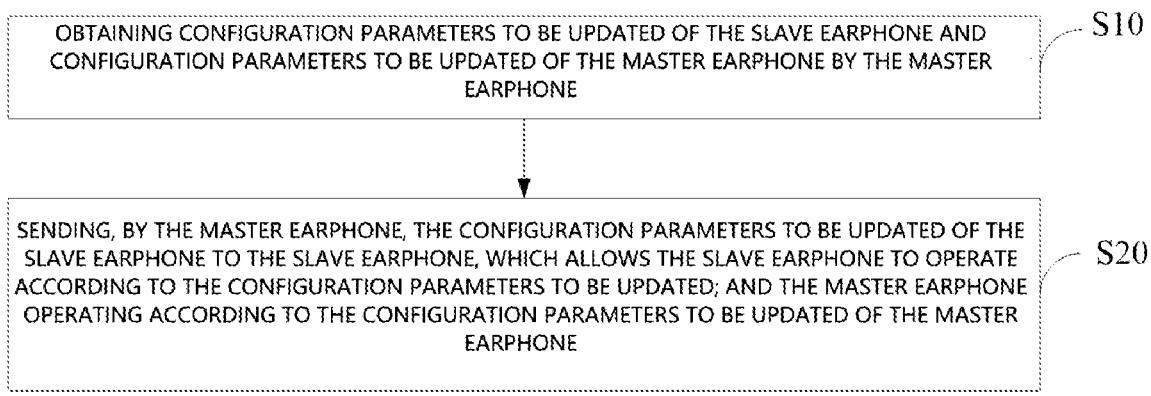
FIG. 2 is a schematic flow diagram according to an embodiment of the earphone debugging method of the present application.

FIG. 2 is a schematic flow diagram according to an embodiment of the earphone debugging method of the present application.

In this embodiment, the earphone debugging method includes the following steps.

At step S10, obtaining configuration parameters to be updated of the slave earphone and configuration parameters to be updated of the master earphone by the master earphone.

In this embodiment, the earphone is a TWS Bluetooth earphone, and the TWS Bluetooth earphone includes two earphones, i.e., a master earphone and a slave earphone. The operating of the earphone may include: a preset terminal device such as a mobile phone is communicatively connected to the master earphone, and then the master earphone is communicatively connected to the slave earphone through wireless communication, so as to realize the true wireless Bluetooth, i.e., individual left and right channels. The configuration parameters to be updated may optionally be EQ (Equalizer) configuration parameters to be updated of the earphone. EQ configuration parameters are used for the gain or attenuation on one or more frequency bands of sound to adjust the timbre. EQ configuration parameters generally include the following three parameters: frequency, a parameter indicating a specific frequency value; gain, a parameter indicating the gain or attenuation on a preset F value; and quantize, a parameter indicating a "width" of frequency band to be gained or attenuated. Specifically, the preset terminal device obtains a Bluetooth broadcast address of the master earphone and a Bluetooth broadcast address of the slave earphone, and is connected with the master earphone according to the Bluetooth broadcast address of the master earphone, and after the connection is successful, the preset terminal device transmits the configuration parameters to be updated of the slave earphone and the configuration parameters to be updated of the master earphone to the master earphone through a BLE GATT protocol (a standard communication protocol). The preset terminal device may transmit the configuration parameters to be updated of the slave earphone and the configuration parameters to be updated of the master earphone to the master earphone at the same time, and then the master earphone synchronizes the configuration parameters to be updated of the slave earphone to the slave earphone, thereby speeding up the earphone debugging efficiency of developers.

Optionally, the method further includes the following steps (after step S10)

At step S11, the master earphone verifying the configuration parameters to be updated of the slave earphone and the configuration parameters to be updated of the master earphone.

At step S12, if the verification is passed, performing the step of sending the configuration parameters to be updated of the slave earphone to the slave earphone.

If the master earphone receives the configuration parameters to be updated of the slave earphone and the configuration parameters to be updated of the master earphone transmitted from the preset terminal device, the master earphone verifies the received configuration parameters to be updated, and if the verification passes, sends the configuration parameters to be updated of the slave earphone to the slave earphone by the master earphone, and the master earphone operates according to the configuration parameters to be updated of the master earphone. Verifying the configuration parameters to be updated of the master and slave earphones can ensure the accuracy of the data and ensure a normal operation of the debugging process of the earphone.

Optionally, step S10 includes the following steps.

At step S103, obtaining a file of configuration parameters to be updated from the preset terminal device by the master earphone.

After the master earphone is communicatively connected to the preset terminal device, the preset terminal device transmits the file of configuration parameters to be updated to the master earphone, wherein the file of configuration parameters to be updated at least includes the configuration parameters to be updated of the master and slave earphones and some other information such as identification information of the configuration parameters to be updated of the master and slave earphones.

At step S104, parsing the file of configuration parameters to be updated and obtaining the configuration parameters to be updated of the slave earphone and the configuration parameters to be updated of the master earphone, by the master earphone.

The master earphone parses the received file of configuration parameters to be updated, obtains the configuration parameters to be updated of the master and slave earphones, and then determines the configuration parameters to be updated of the master earphone from the parsed data according to the identification information of the master earphone, and determines the configuration parameters to be updated of the slave earphone from the parsed data according to the identification information of the slave earphone.

Optionally, the method further includes the following steps (before step S103)

At step S101, obtaining a Bluetooth broadcast address of the master earphone by the master earphone.

At step S102, sending the Bluetooth broadcast address of the master earphone to the preset terminal device by the master earphone, which allows the preset terminal device to send the file of configuration parameters to be updated according to the Bluetooth broadcast address.

The master earphone obtains a Bluetooth broadcast address of the master earphone and a Bluetooth broadcast address of the slave earphone, and performs Bluetooth broadcasting. The master earphone realizes the Bluetooth connection between the master earphone and the preset terminal device according to the Bluetooth broadcast address of the master earphone and realizes the Bluetooth connection to the slave earphone according to the Bluetooth broadcast address of the slave earphone, so as to facilitate subsequent data transmission and realize information communication.

At step S20, sending, by the master earphone, the configuration parameters to be updated of the slave earphone to the slave earphone, which allows the slave earphone to operate according to the configuration parameters to be updated of the slave earphone; and the master earphone operating according to the configuration parameters to be updated of the master earphone.

After the master earphone successfully receives the configuration parameters to be updated of the master earphone and the configuration parameters to be updated of the slave earphone transmitted from the preset terminal device, the master earphone transmits the configuration parameters to be updated of the slave earphone to the slave earphone through an AVRCP protocol (Audio/Video Remote Control Profile). Meanwhile, the master earphone stores the configuration parameters to be updated of the master earphone to a local storage device and operates according to the configuration parameters to be updated, thereby realizing the update of the configuration parameters of the master and slave earphones. In addition, after the slave earphone successfully receives the configuration parameters to be updated of the slave earphone, the slave earphone stores the received configuration parameters to be updated to a local storage device of the slave earphone and operates according to the configuration parameters to be updated, thereby updating the configuration parameters at the same time with the master earphone, and improving the debugging efficiency of developers. Optionally, the local storage device is a flash memory, which is a non-volatile memory, so that the data will not be lost even if it is powered off. As such, the master earphone can receive the configuration parameters to be updated of the master and slave earphones wirelessly, without the need to be wired out and use a computer for debugging, and the slave earphone can update the configuration parameters at the same time, without the need to debug the configuration parameters of the master and slave headphones one-by-one, which can meet the requirement of online dynamic debugging needed by the developers, so that the work efficiency of developers is higher and the debugging cost is lower.

Optionally, the method further includes the following steps (after step S20)

At step S21, determining, by the master earphone, whether the sending of the configuration parameters to be updated of the slave earphone is completed.

At step S22, storing the configuration parameters to be updated of the master earphone to a local storage device by the master earphone if the sending of the configuration parameters to be updated of the slave earphone is completed.

Optionally, after the master earphone successfully receives the configuration parameters to be updated of the master earphone and the configuration parameters to be updated of the slave earphone transmitted from the preset terminal device, the master earphone first transmits the configuration parameters to be updated of the slave earphone to the slave earphone, and after the transmission of the configuration parameters to be updated of the slave earphone is completed, the master earphone stores the configuration parameters to be updated of the master earphone to the local storage device and operates according to the configuration parameters to be updated stored in the local storage device, so that the master and slave earphones can update the configuration parameters at the same time. Optionally, if the master earphone sends the configuration parameters to be updated of the slave earphone to the slave earphone, the master earphone simultaneously sends query information indicating whether the sending of query data to the slave earphone is completed, and if receiving a response information sent back from the slave earphone, the master earphone determines that the sending of the configuration parameters to be updated of the slave earphone is completed. Optionally, the local storage device is a flash memory, which is a non-volatile memory, so that the data will not be lost even if it is powered off. As such, even if the earphone is powered off and restarted, the configuration parameters previously set are still valid, and the mobile phone can also obtain the current EQ configuration parameters of the master and slave earphones in real time, and the user experience is better.

Optionally, the method further includes the following steps (after step S21).

At step S23, if the sending of the configuration parameters to be updated of the slave earphone is failed, the method returns to the step of sending the configuration parameters to be updated of the slave earphone to the slave earphone.

If the sending of the configuration parameters to be updated of the slave earphone is failed, for example, if the configuration parameters to be updated of the slave earphone cannot be successfully received by the slave earphone due to disconnection or power failure, the master earphone continues the step of sending the configuration parameters to be updated of the slave earphone to the slave earphone until the configuration parameters to be updated of the slave earphone are successfully received by the slave earphone. Optionally, if the master earphone does not receive the response information sent back from the slave earphone within a preset time, the master earphone determines that the sending of the configuration parameters to be updated of the slave earphone is failed, then the master earphone resends the configuration parameters to be updated of the slave earphone until the master earphone receives the response information sent back from the slave earphone.

According to the embodiments of the present application, configuration parameters to be updated of the slave earphone and configuration parameters to be updated of the master earphone are obtained by the master earphone, and sends the configuration parameters to be updated of the slave earphone to the slave earphone, so that the slave earphone operates according to the configuration parameters to be updated, and the master earphone operates according to the configuration parameters to be updated of the master earphone. In this way, the configuration parameters of the master earphone and the slave earphone can be updated at the same time, and online dynamic debugging of the earphone can be achieved, effectively improving the debugging efficiency of developers and reducing the debugging cost of the developers.

Figure 3:
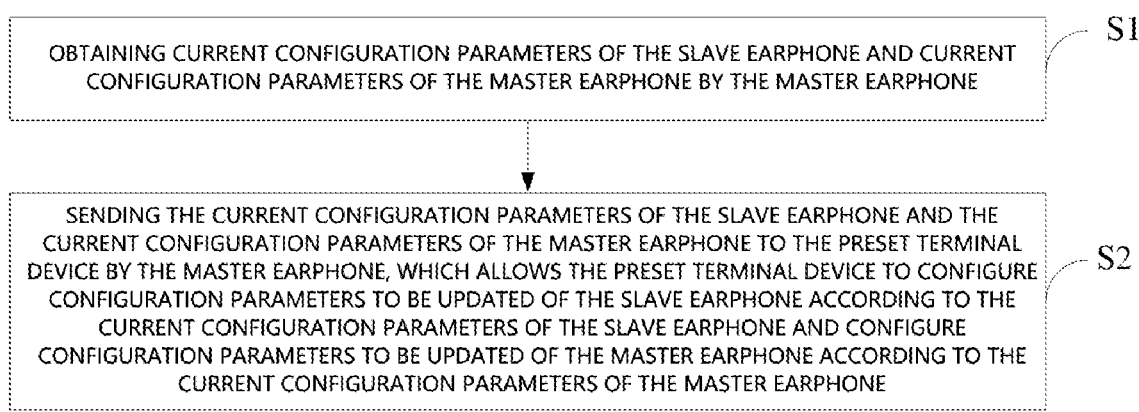
FIG. 3 is a schematic flow diagram according to another embodiment of the earphone debugging method of the present application.

Optionally, referring to FIG. 3, in an embodiment, the method further includes the following steps (before step S10).

At step S1, obtaining current configuration parameters of the slave earphone and current configuration parameters of the master earphone by the master earphone.

Obtaining the current configuration parameters of the slave earphone by the master earphone, i.e., the current EQ configuration parameters of the slave earphone, from the slave earphone, and obtaining current EQ configuration parameters of the master earphone from the local storage device of the master earphone.

Optionally, step S1 includes the following steps.

At step S1A, receiving, by the master earphone, a configuration update instruction sent by the preset terminal device.

The configuration update instruction refers to an instruction indicating the update of the configuration parameters given by the developer to the master and slave earphones through the preset terminal device. The master earphone receives the configuration update instruction sent by the preset terminal device.

At step S1B, sending the configuration update instruction to the slave earphone and receiving current configuration parameters of the slave earphone sent back from the slave earphone, by the master earphone;

If the master earphone receives the configuration update instruction sent by the preset terminal device, the master earphone transmits the configuration update instruction to the slave earphone, so that the slave earphone can read the current configuration parameters of the slave earphone from the local storage device thereof according to the configuration update instruction, and sends back the read current configuration parameters of the slave earphone to the master earphone. That is, if the slave earphone receives the configuration update instruction transmitted from the master earphone, the slave earphone reads the current configuration parameters of the slave earphone from the local storage device thereof, and sends back the read current configuration parameters of the slave earphone to the master earphone.

At step S1C, obtaining current configuration parameters of the master earphone from a local storage device according to the configuration update instruction by the master earphone.

At the same time, the master earphone reads the current configuration parameters of the master earphone from the local storage device thereof according to the configuration update instruction. Optionally, if the master earphone receives the current configuration parameters of the slave earphone sent back from the slave earphone, the master earphone reads the current configuration parameters of the master earphone from the local storage device thereof. Alternatively, if the configuration update instruction is sent to the slave earphone, the master earphone reads the current configuration parameters of the master earphone from the local storage device thereof.

At step S2, sending the current configuration parameters of the slave earphone and the current configuration parameters of the master earphone to the preset terminal device by the master earphone, which allows the preset terminal device to configure the configuration parameters to be updated of the slave earphone according to the current configuration parameters of the slave earphone and to configure the configuration parameters to be updated of the master earphone according to the current configuration parameters of the master earphone.

After successfully obtaining the current configuration parameters of the slave earphone and the current configuration parameters of the master earphone, the master earphone sends the current configuration parameters of the slave earphone and the current configuration parameters of the master earphone to the preset terminal device, which allows the preset terminal device to configure the configuration parameters to be updated of the slave earphone according to the current configuration parameters of the slave earphone and to configure the configuration parameters to be updated of the master earphone according to the current configuration parameters of the master earphone. That is, by sending the current configuration parameters of the master and slave earphones to the preset terminal device, the developers are provided with a reference to configure the configuration parameters to be updated of the master and slave earphones, so that the debugging effect of the configuration parameters to be updated of the master and slave earphones can be better, and the requirements of users are well satisfied.

The present application also provides an earphone debugging device, including a memory, a processor, and an earphone debugging program stored in the memory and executable on the processor, wherein when the processor executes the earphone debugging program, the steps of the earphone debugging method as described above are performed.

The present application also provides a storage medium, on which an earphone debugging program is stored, wherein when a processor executes the earphone debugging program, the steps of the earphone debugging method as described above are performed. The various embodiments in this specification are described in a parallel or progressive manner, and each embodiment focuses on the differences from other embodiments, and the same or similar parts between the various embodiments may be referred to each other. As for the device disclosed in the embodiment, since it corresponds to the method disclosed in the embodiment, the description is relatively simple. For relevant parts, please refer to the description of the method.

Those of ordinary skill in the art will understand that the units and algorithm steps of each example described in conjunction with the embodiments disclosed herein can be implemented by electronic hardware, computer software, or a combination thereof. In order to clearly explain the interchangeability of hardware and software, the composition and steps of each example have been generally described in the above description in terms of function. Whether these functions are performed in hardware or software depends on the specific application and design constraints of the embodiment. Those skilled in the art may implement the described functions for each specific application using different methods, but such implementations should not be considered beyond the scope of the present application.

The steps of the method or algorithm described in connection with the embodiments disclosed herein may be directly implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium known in the art.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "comprising a . . . " does not preclude the presence of additional identical elements in the process, method, article or apparatus including the element.

What is claimed is:

1. An earphone debugging method, the earphone comprises a master earphone and a slave earphone, and the master earphone is wirelessly communicated with the slave earphone and a preset terminal device, the earphone debugging method comprises the following steps:
obtaining current configuration parameters of the slave earphone and current configuration parameters of the master earphone by the master earphone, wherein the configuration parameters are equalizer configuration parameters;
sending the current configuration parameters of the slave earphone and the current configuration parameters of the master earphone to the preset terminal device by the master earphone, which allows the preset terminal device to configure the configuration parameters to be updated of the slave earphone according to the current configuration parameters of the slave earphone and to configure the configuration parameters to be updated of the master earphone according to the current configuration parameters of the master earphone;
obtaining configuration parameters to be updated of the slave earphone and configuration parameters to be updated of the master earphone from the present terminal device by the master earphone;
sending, by the master earphone, the configuration parameters to be updated of the slave earphone to the slave earphone, which allows the slave earphone to operate according to the configuration parameters to be updated of the slave earphone; and
the master earphone operating according to the configuration parameters to be updated of the master earphone.

2. The earphone debugging method of claim 1, wherein the step of obtaining current configuration parameters of the slave earphone and current configuration parameters of the master earphone by the master earphone comprises:
receiving a configuration update instruction sent by the preset terminal device by the master earphone;
sending the configuration update instruction to the slave earphone and receiving the current configuration parameters of the slave earphone sent back from the slave earphone, by the master earphone; and
obtaining the current configuration parameters of the master earphone from a local storage device according to the configuration update instruction by the master earphone.

3. The earphone debugging method of claim 1, wherein the method further comprises, after the step of sending, by the master earphone, the configuration parameters to be updated of the slave earphone to the slave earphone:
determining, by the master earphone, whether the sending of the configuration parameters to be updated of the slave earphone is completed; and
storing the configuration parameters to be updated of the master earphone to a local storage device by the master earphone if the sending of the configuration parameters to be updated of the slave earphone is completed.

4. The earphone debugging method of claim 3, wherein the method further comprises, after the step of determining, by the master earphone, whether the sending of the configuration parameters to be updated of the slave earphone is completed:
if the sending of the configuration parameters to be updated of the slave earphone is failed, the method returns to the step of sending the configuration parameters to be updated of the slave earphone to the slave earphone.

5. The earphone debugging method of claim 1, wherein the step of obtaining configuration parameters to be updated of the slave earphone and configuration parameters to be updated of the master earphone by the master earphone comprises:
obtaining a file of configuration parameters to be updated from a preset terminal device by the master earphone; and
parsing the file of configuration parameters to be updated and obtaining the configuration parameters to be updated of the slave earphone and the configuration parameters to be updated of the master earphone, by the master earphone.

6. The earphone debugging method of claim 5, wherein the method further comprises, before the step of obtaining a file of configuration parameters to be updated from the preset terminal device by the master earphone:
obtaining a Bluetooth broadcast address of the master earphone by the master earphone; and
sending the Bluetooth broadcast address of the master earphone to the preset terminal device by the master earphone, which allows the preset terminal device to send the file of configuration parameters to be updated according to the Bluetooth broadcast address.

7. The earphone debugging method of claim 1, wherein the method further comprises, after the step of obtaining configuration parameters to be updated of the slave earphone and configuration parameters to be updated of the master earphone by the master earphone:

verifying the configuration parameters to be updated of the slave earphone and the configuration parameters to be updated of the master earphone by the master earphone; and if the verification is passed, performing the step of sending, by the master earphone, the configuration parameters to be updated of the slave earphone to the slave earphone.

8. An earphone debugging device, comprising a memory, a processor, and an earphone debugging program stored in the memory and executable on the processor, wherein when a processor executes the earphone debugging program, the steps of the earphone debugging method of claim 1 are performed.

9. A storage medium, wherein an earphone debugging program is stored on the storage medium, wherein when the processor executes the earphone debugging program, the steps of the earphone debugging method of claim 1 are performed.

\* \* \* \* \*